(12) United States Patent
Wengelnik et al.

(10) Patent No.: US 9,889,794 B2
(45) Date of Patent: Feb. 13, 2018

(54) METHOD OF OPERATING AN ILLUMINATION SYSTEM FOR AN INTERIOR OF A VEHICLE, ILLUMINATION SYSTEM FOR AN INTERIOR OF A VEHICLE, AND VEHICLE

(71) Applicant: Volkswagen Aktiengesellschaft, Wolfsburg (DE)

(72) Inventors: Heino Wengelnik, Wolfsburg (DE); Michael Scheible, Flechtorf (DE); Markus Neumann, Vordorf (DE); Christian Burghoff, Braunschweig (DE); Thorb Baumgarten, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/498,087

(22) Filed: Apr. 26, 2017

(65) Prior Publication Data

US 2017/0313245 A1    Nov. 2, 2017

(30) Foreign Application Priority Data

Apr. 28, 2016   (DE) .......................... 10 2016 207 273

(51) Int. Cl.
*B60K 35/00*   (2006.01)
*B60Q 3/85*   (2017.01)
(Continued)

(52) U.S. Cl.
CPC .............. *B60Q 3/85* (2017.02); *B60Q 3/217* (2017.02); *B60Q 3/745* (2017.02)

(58) Field of Classification Search
None
See application file for complete search history.

(56) References Cited

U.S. PATENT DOCUMENTS

| 6,402,354 | B1 | 6/2002 | Tatewaki et al. |
| 7,949,152 | B2 | 5/2011 | Schofield et al. |

(Continued)

FOREIGN PATENT DOCUMENTS

| DE | 10006943 A1 | 8/2001 |
| DE | 102008023505 A1 | 11/2009 |

(Continued)

*Primary Examiner* — Dedei K Hammond
(74) *Attorney, Agent, or Firm* — Dienwiebel Transatlantic IP; Thomas Dienwiebel

(57) ABSTRACT

The invention relates to a method for operating an illumination system (1) for an interior (31) of a vehicle (30), the illumination system (1) having a control unit (2) and an ambient illumination (10) with at least one lamp (11), which is designed to emit light in at least one ambient color (40). Furthermore, the invention relates to an illumination system (1) for illuminating an interior (31) of a vehicle (30), having an ambient illumination (10) with at least one lamp (11), which is designed to emit light in at least one ambient color (40), wherein furthermore at least one functional element (20) is arranged in the interior (31) of the vehicle (30), which has an element color (50) for displaying the functional element (20), as well as a vehicle (30) with an illumination system (1) for illuminating an interior (31) of the vehicle (30).

19 Claims, 2 Drawing Sheets

(51) Int. Cl.
*B60Q 3/74* (2017.01)
*B60Q 3/217* (2017.01)

(56) References Cited

U.S. PATENT DOCUMENTS

| | | |
|---|---|---|
| 8,786,418 B2 | 7/2014 | Lucas |
| 8,922,388 B2 | 12/2014 | Nykerk |
| 2011/0084852 A1* | 4/2011 | Szczerba ............ G01C 21/3626 340/905 |
| 2011/0180728 A1* | 7/2011 | Sawayanagi ............. B60Q 3/68 250/461.1 |

FOREIGN PATENT DOCUMENTS

| | | |
|---|---|---|
| DE | 102014223133 A1 | 5/2015 |
| EP | 2045656 A1 | 4/2009 |
| EP | 1344688 B1 | 11/2012 |
| WO | 0136870 A1 | 5/2001 |

\* cited by examiner

METHOD OF OPERATING AN ILLUMINATION SYSTEM FOR AN INTERIOR OF A VEHICLE, ILLUMINATION SYSTEM FOR AN INTERIOR OF A VEHICLE, AND VEHICLE

CROSS-REFERENCE TO RELATED APPLICATIONS

The present application claims priority benefit to German Patent Application DE 10 2016 207 273.0, filed on Apr. 28, 2016. The contents of the aforementioned German Patent Application are incorporated herein by reference for all purposes to the extent that such contents is not inconsistent with the present application.

BACKGROUND

The present invention relates to a method for operating an illumination system for an interior of a vehicle, the illumination system having a control unit and an ambient illumination with at least one lamp, which is designed to emit light in at least one ambient color. Furthermore, the invention relates to an illumination system for illuminating an interior of a vehicle, having an ambient illumination with at least one lamp, which is designed to emit light in at least one ambient color, wherein furthermore at least one functional element is arranged in the interior of a vehicle, which has an element color for displaying the functional element as well as a vehicle with an illumination system for illuminating an interior of the vehicle.

In modern vehicles, illumination systems for illuminating an interior of the vehicles are used. In particular, such illumination systems can have an ambient illumination, through which an indirect illumination of the interior is provided. Such ambient illuminations each have at least one lamp, which is designed to emit light in at least one ambient color. In this manner, it is possible to be able to provide an extensive and thus even illumination of an interior of the vehicle.

Furthermore, functional elements are often arranged in the interior of a vehicle, which are provided for example for displaying a state of the vehicle or for operating functions of the vehicle. For example, such functional elements can be display elements for a speed, but also control elements, for example for adjusting a climate control of the vehicle. It is known to identify the position of such a functional element, but also for example a functional state of the functional element, by using a color; see for example EP 1 344 688 B1. In particular, it is also known to change the color used to display the functional element depending on the displayed vehicle state or respectively the assumed state of the functional element; see for example WO 01/36870 A1. However, this can lead to a reduction in detectability of the functional element for a user, in particular when a color of the illumination of the interior of the vehicle is the same as or very similar to the color used to display the functional element. In this case, it is very difficult for the user of the vehicle to differentiate between the functional element and the interior illumination, whereby for example a locating of the functional element but also an identification of the state of the vehicle shown by the functional element is at least made more difficult if not prevented entirely.

SUMMARY

Thus, an object of the present invention is to at least partially eliminate the disadvantages in the illumination of an interior of a vehicle described above.

Further objects are to provide a method of operating an illumination system for an interior of a vehicle, an illumination system for illuminating an interior of a vehicle, and a vehicle, through which the visibility of a functional element or respectively a state of the vehicle displayed by the functional element can be improved in a particularly simple and cost-effective manner and in particular also when the interior illumination is switched on.

The above object is solved by a method of operating an illumination system for an interior of a vehicle with the features of the independent method claim. Furthermore, the object is solved by an illumination system for illuminating an interior of a vehicle with the features of the associated independent apparatus claim, as well as by a vehicle with the features of the associated independent apparatus claim.

BRIEF DESCRIPTION OF THE DRAWINGS

Further features and details of the invention will become apparent from the dependent claims, the description, and the drawings, the latter of which show schematically in FIG. 1 an embodiment of a method according to the invention;

DETAILED DESCRIPTION OF EMBODIMENTS

Figure 1:
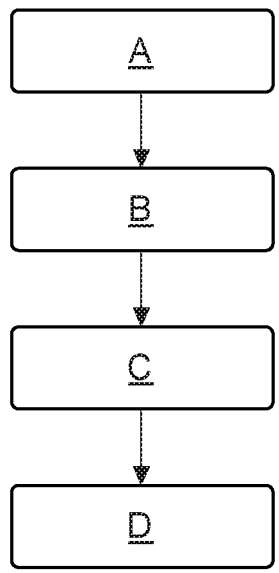

It is noted that features and details described in connection with the inventive method also apply in connection with the illumination system as well as the vehicle and vice versa so that with respect to the disclosure the individual aspects are or can always be referenced and combined in all directions.

According to a first aspect, a method for operating an illumination system for an interior of a vehicle is provided, the illumination system having a control unit and an ambient illumination with at least one lamp, which is designed to emit light in at least one ambient color. A method according to the first aspect is characterized by the following steps:

a) Determination of an element color, which is assumed by a functional element arranged in the interior of the vehicle for displaying the functional element, by the control unit, b) Provision of at least one ambient color by the control unit, wherein the at least one ambient color is different from the element color determined in step a), c) Selection of an ambient color from the at least one ambient color provided in step b), d) Emission of light in the ambient color selected in step c) by the lamp of the ambient illumination.

An interior of a vehicle can be illuminated with at least one ambient color by an illumination system, which is operated by a method according to the first aspect. Such an ambient illumination is in one embodiment designed in particular for the extensive emission of light and thus for an indirect illumination of the interior of the vehicle. This type of indirect illumination thus represents for a user of the vehicle a particularly comfortable and non-distracting illumination of the interior of the vehicle. Furthermore, functional elements of the vehicle are often arranged in such an interior of the vehicle. Such functional elements can be designed for example to show a vehicle state, for example a speed or navigational information of the vehicle. Furthermore, such functional elements can also be designed to control functions of the vehicle, for example a climate control of the vehicle.

Through element colors, which are exhibited by the functional elements, the locating of the functional element in the interior of a vehicle can be facilitated for a user. Also, a display of a functional state, in particular of a functional state of the vehicle or a set functional state of the functional element itself, can also be shown by such an element color. In order to be able to provide this display of the functional element with the help of the element color, it may be advantageous if this functional color is not covered by the ambient illumination of the illumination system.

For this, the element color that is assumed by the functional element for displaying the functional element is determined in a first step a) of a method according to the first aspect by a control unit. This element color can be both the element color intended to merely serve to locate the functional element but naturally also an element color that can be assumed by the functional element in order to show a certain functional state, for example of the vehicle or the functional element. It is thus determined through this step a), which can be executed like the entire method for example through a control unit, which value the color of the functional element has.

This determined element color is used in the next step b) to select at least one ambient color for the ambient illumination. The at least one ambient color is provided by the control unit such that this selected ambient color is different from the element color determined in step a).

Different in terms of the present explanation means in particular that the ambient color and the element color are not the same. Furthermore, different in terms of this explanation may also mean that the ambient color can be differentiated from the element color by a user, in particular without problems, in one or more corresponding embodiments.

Provision in terms of the first aspect means in particular that, in the case of more than one provided ambient color, a selection option can be provided for the selectable ambient color. The selectable ambient colors are provided such that, for one, they can be emitted by the lamp of the ambient illumination and, on the other hand, are different from the element color of the functional element. It can thereby be ensured that in the following step c) an ambient color can be selected, which can be emitted for one by the ambient illumination and, on the other hand, enables trouble-free location or respectively identification of the functional element due to the fact that it is different from the element color.

In a last step d) of a method according to the first aspect, light is then emitted in the ambient color selected in step c) by the ambient illumination of the illumination system.

In this manner, an ambient and thus extensive illumination of the interior of a vehicle can thus be provided in a particularly simple and cost-effective manner, which simultaneously enables a secure identification and location of a functional element arranged in the interior of the vehicle. User friendliness and comfort for a user of such a vehicle can thereby be increased with such a lighting system.

Furthermore, and in corresponding embodiments, the selection of an ambient color in step c) may be performed manually by a user of the vehicle or by the control unit. This selection of the ambient color makes sense in particular when more than just one possible ambient color is provided in step b). The selection by a user makes it possible for the user of the vehicle to have a direct impact on the ambient illumination for the interior of the vehicle. Alternatively or additionally and in corresponding embodiments, this selection can also be performed by the control unit itself. The basis of the decision for the control unit can be for example a brightness outside the vehicle to which the ambient illumination can be adjusted. In particular, both in the case of a selection by the user as well as in the case of a selection by the control unit it can also be ensured by the provision of the ambient color performed in step b) differently from the determined element color that regardless of the selection of the ambient color, a detection of the functional element itself as well as of a display of a functional state by the functional element can be ensured at all times.

Moreover, a method according to the first aspect can, in corresponding embodiments, be designed such that in the control unit colors are saved in a parameterized manner in a color space, in particular in an additive color space, and/or in an RGB color space, wherein in step b) in the provision of the at least one ambient color in the color space an area is kept free around the element color. Such a color space represents a parameterized combination in particular of all possible colors that can be emitted for example by the lamp of the ambient illumination.

Since such a lamp of an ambient illumination is in particular an active light-emitting element, an additive color space is thus particularly well suited for such a color space, wherein an RGB color space represents a particularly prevalent and sensible parameterization of such an additive color space. Keeping an area around the element color free means in terms of the first aspect in particular that a color, the parameterization of which lies in this area, is not provided in step b) of the present method according to the embodiments described.

Such an area can be for example a fixed distance from the element color in the color space, expressed in the corresponding parameterization of the color space. A geometric body can also be used for example in the parameterization of the color space; a circle, a rectangle or the like for example in the case of a two-dimensional color space; or a sphere, a cube or the like in the case of a three-dimensional color space. By keeping an area in the color space around the element color free, it can be ensured in a particularly simple manner that the ambient color provided in step b) is different from the element color. In particular, such an area can also be defined generally and thus independently of the element color. The once defined area can thereby be linked to all possible element colors of the functional element and thereby respectively arranged around them. In this manner, the ambient colors that should not be used do not need to be saved individually for all possible element colors. A method according to the present aspect can thus be simplified in this manner through an area to be kept free in the color space.

In an additional or alternative embodiment, the functional element has one or more functional states with different element colors, wherein in step b) the at least one ambient color is different at least with respect to the active element color. It can be provided through the different element colors in particular and in corresponding embodiments that the element color is selected depending on the respective functional state. Such a functional state can be for example a switched on or respectively switched off state of the functional element.

Alternatively or additionally and in a further embodiment, intermediate states of the functional element can also be displayed by different element colors, for example if the functional element is designed as a slide control.

An active element color in terms of the present explanation is in particular the element color currently exhibited by the functional element. Through the provision of the at least one ambient color in step b) depending on at least the active element color, it can be ensured that the ambient illumination securely emits a different ambient color than the active element color of the functional element. A difference between the ambient color and the element color can be ensured in this manner independently of a functional state of the functional element. Synonymously, a functional element can also be easily detectable or visually perceptible with respect to an ambient illumination independently of its functional state and the then active element color and can be designed to be distinguishable from it.

According to a second aspect, an illumination system for illuminating an interior of a vehicle is provided, which illumination system having an ambient illumination with at least one lamp, which is designed to emit light in at least one ambient color, wherein furthermore at least one functional element is arranged in the interior of the vehicle, which has an element color for displaying the functional element.

An illumination system according to the present aspect is characterized in that the ambient color at least in the vicinity of the functional element is provided differently than the element color.

In the interior of a vehicle, an ambient illumination can be provided by such an illumination system according to the present aspect. Such an ambient illumination is designed in particular for the extensive emission of light in at least one ambient color, for which the ambient illumination has at least one lamp. Furthermore, at least one functional element is arranged in the interior of the vehicle, wherein the functional element has an element color. This element color can be provided for example for displaying the functional element but also for example for displaying a functional state of the functional element.

According to an embodiment, the ambient color of the ambient illumination is provided at least in the vicinity of the functional element differently than the element color. In particular and in an embodiment, the ambient color can also be selected depending on the function color such that a difference between the ambient color and the element color is given at all times. Different in terms of the present explanation means in particular that the ambient color and the element color are at least not the same and, moreover, the ambient color may in corresponding embodiments be different from the element color such that a user can differentiate between the two colors. It can be ensured through the use of such an ambient color that is different from the element color in the ambient illumination of the illumination system according to the present aspect that the functional element can be identified by a user at all times. A masking of the functional element, in particular the element color of the functional element, by the ambient illumination, in particular the ambient color of the ambient illumination, can thereby be prevented.

In a further embodiment, the illumination system has a control unit, which is designed to execute a method according to the first aspect, discussed in the preceding. Accordingly, an illumination system according to the current aspect has the same advantages as explained in relation to a method according to the first aspect. The control unit can be integrated into the illumination system in an embodiment. Alternatively and in a corresponding embodiment, the control unit can also be designed for example as a part of a superordinate control system of the vehicle.

Furthermore, it can be provided in an illumination system according to the present aspect in further embodiments that the functional element has an illumination element, in particular an illumination stone, for the active emission of light in the element color. In this manner, an active display of the functional element, in particular a functional state of the functional element or respectively the vehicle, can be provided in a particularly simple manner. Through such lamp, which is in one embodiment provided as an illumination stone, for example as an LED illumination stone, an active emission of light in the element color can be provided. Even in dark environments, for example in the case of dimmed ambient illumination, the identification of the functional element or respectively of a functional state shown by the functional element can be provided in a particularly simple and safe manner.

Moreover, and in an embodiment, the functional element may be designed as one or more of the following elements:
Button
Switch
Slide control
Screen element.

It is noted that this list is not complete, so that, if it makes sense from a technical perspective, other components can also be used as functional elements. In particular, it is noted that many different functions can be fulfilled by screen elements. Thus, such a screen element can also be designed for example as a button, switch, or slide control. Furthermore, a screen element can also be designed additionally or alternatively as a selection cursor in a list on the screen. The screen on which the screen element is displayed may in one embodiment be provided as a touchscreen. The screen element in one embodiment may be directly activated by touching the screen. In each of these variations according to the embodiments described, it may be provided through the corresponding provision of the ambient color, performed in step b) of a method according to the preceding aspect, that, regardless of the design of the functional element, the functional element in its element color is easily identifiable by a user at all times and its state is also easily identifiable.

Furthermore, it can be provided in an illumination system according to the present aspect according to another embodiment that the functional element has a frame section, wherein the frame section is colored in the ambient color. A particularly good embedding of the functional element in the rest of the interior of the vehicle can be provided in this manner. In that in particular a different ambient color and element color are selected, the good distinguishability and the thereby enabled good identifiability of the functional element may also be provided in this embodiment.

According to a third aspect, a vehicle with an illumination system for illuminating an interior of the vehicle is provided. A vehicle according to the present aspect is characterized in that the illumination system is designed according to the second aspect.

Accordingly, a vehicle according to the current aspect has the same advantages as explained in relation to an illumination system according to the second aspect. In an embodiment, an illumination system according to the second aspect is designed for executing a method according to the first aspect. Accordingly, a vehicle according to the present aspect naturally has the same advantages as explained in detail in relation to a method according to the first aspect.

Further advantages, with features and details, result from the following description, in which exemplary embodiments of the invention are described in detail with reference to the drawings. The features mentioned in the claims and in the specification can be used to advantage individually or in any combination. Elements with the same function and mode of operation are provided with the same reference numerals in the individual figures.

FIG. 1 shows an embodiment of a method for operating an illumination system 1 for an interior 31 of a vehicle 30.

The devices required in this embodiment to execute the method are not shown. An element color 50 of a functional element 20 is determined in a first step a) of a method according to the present embodiment, labeled with A in FIG. 1. This element color 50 is used by the functional element 20 in order to display the functional element 20 in the interior 31 of the vehicle 30. Such a display can be for example the mere display of a local position of the functional element 20 but also a display of a functional state 21 of the functional element 20 or respectively the entire vehicle 30. Through the determination of the element color 50 performed in step a), it is determined, which ambient colors 40 can be used by an ambient illumination 10 of an illumination system 1 according to the present embodiment.

A provision of these ambient colors 40 is performed in step b) of a method according to the present embodiment, labeled with B in FIG. 1. At least one ambient color 40 is provided by a control unit 2, wherein the at least one ambient color 40 is different from the element color 50 selected in step a).

Different in terms of the current explanation means in particular that the ambient color 40 and the element color 50 are not the same. For this, during the provision of the at least one ambient color 40, for example an area 61, which is defined in a color space 60, around the element color 50 can be kept free. From these ambient colors 40 provided in step b), an ambient color 40 is selected in the next step c), labeled with C in FIG. 1, which is then emitted by the lamp 11 of the ambient illumination 10 in the following step d), labeled with D in FIG. 1. This selection of the ambient color 40 can be performed by a user of the vehicle 30 and/or alternatively or additionally by the control unit 2. Overall, an ambient illumination 10 can thus be provided by a method according to the present embodiment, which for one provides an extensive and even illumination of an interior 31 of a vehicle 30, wherein a detection of a functional element 20 can simultaneously be ensured at all times.

This detection of the functional element 20 is enabled in particular in that the ambient color 40 used by the ambient illumination 10 is detectably different from an element color 50, which is assumed by the functional element 20.

Figure 2:
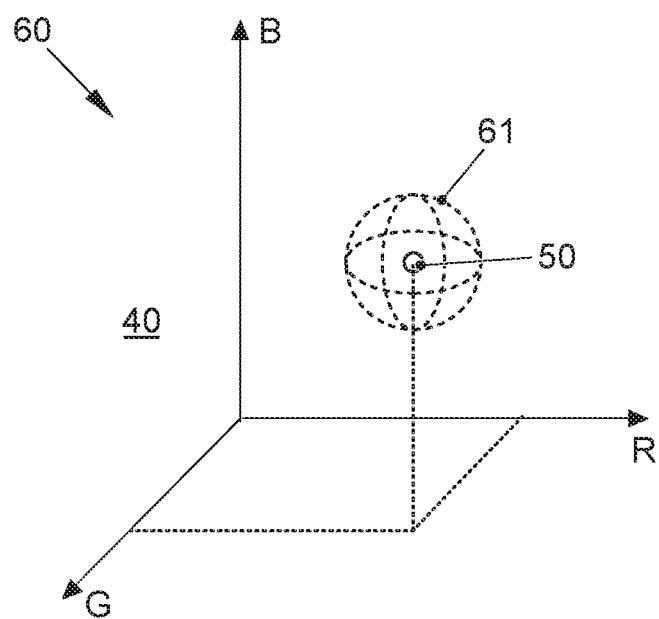
FIG. 2 a color space.

FIG. 2 shows schematically an exemplary color space 60, which may be used in a method according to the preceding embodiment. It is an additive RGB color space 60, in which the element color 50 and the ambient color 40 are present as parameterized colors. Besides the element color 50, an area 61 is shown, which is arranged in the color space 60 around the element color 50. This area 61 may in this embodiment kept free by the control unit 2 during the provision of the ambient color 40. The ambient color 40 is thus only selected from colors that lie outside of this area 61. A distinguishability of the element color 50 from the ambient color 40 can thereby be ensured in a particularly simple manner.

Figure 3:
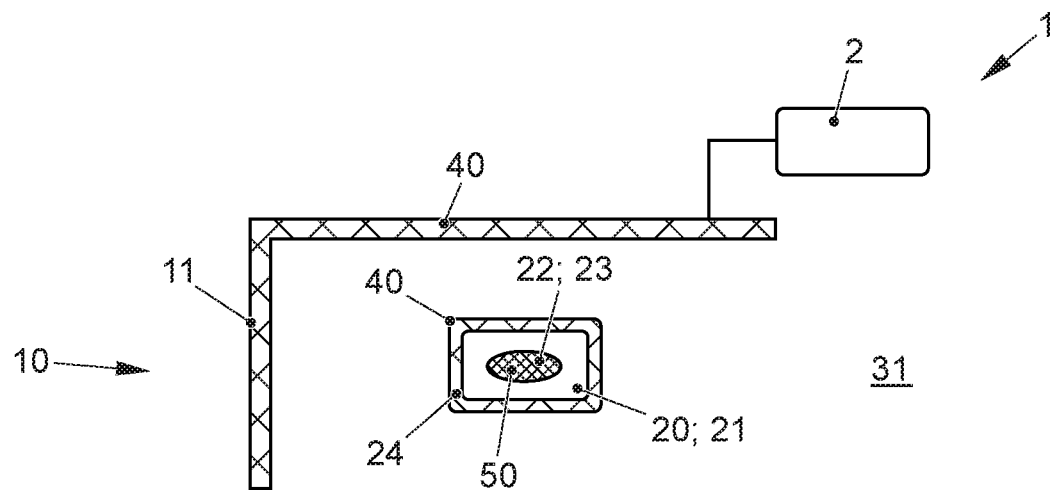
FIG. 3 an embodiment of an illumination system according to the invention.

FIG. 3 shows an illumination system 1 according to another embodiment, wherein in particular the lamp 11 of an ambient illumination 10 controlled by a control unit 2 is shown.

The lamp 11 is designed for emitting light in at least one ambient color 40. Functional elements 20, one of which is shown in FIG. 3, are arranged in the interior 31 of the test vehicle 30 (not shown). The functional element 20 has a frame section 24, which is colored in the ambient color 40 of the ambient illumination 10. The functional element 20, which is in a functional state 21, has an illumination element 22 in the center. This illumination element 22 may in an embodiment be designed as an illumination stone 23, for example as an LED illumination stone 23. This illumination stone 23 is designed to emit an element color 50, for example yellow. This element color 50 is detected by the control unit 2 and the ambient color 40 is then selected such that it is different from the element color 50. A particularly good distinguishability of the entire functional element 20, in particular even when the ambient illumination 10 is active, could then thereby be ensured at all times.

Figure 4:
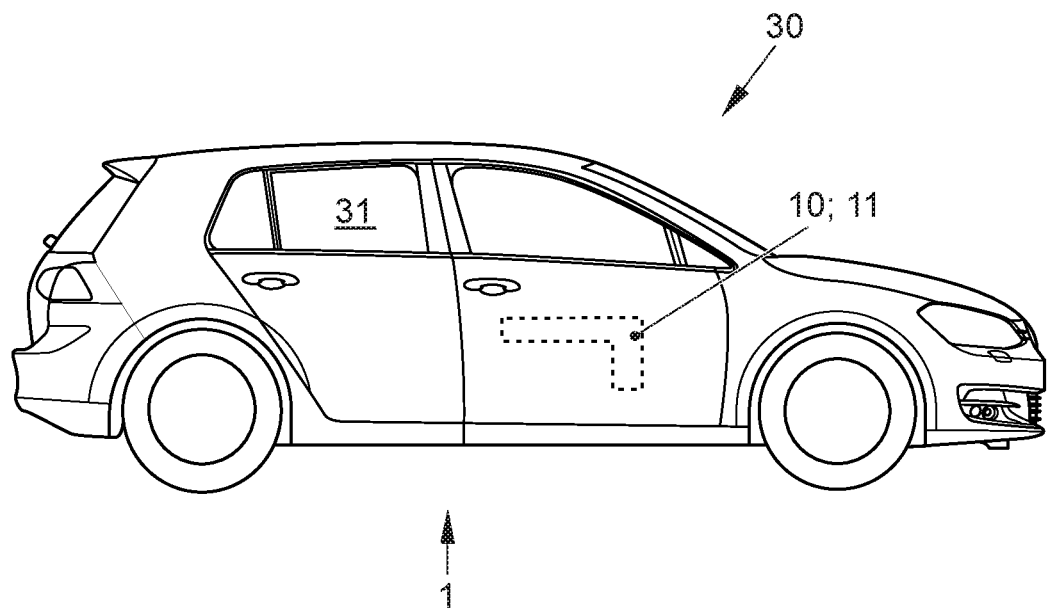
FIG. 4 an embodiment of a vehicle according to the invention.

FIG. 4 shows a vehicle 30 according to another embodiment, in the interior 31 of which an illumination system 1 according to a preceding embodiment is arranged. A lamp 11 of an ambient illumination 10 of such an illumination system 1 is shown with a dashed line. In particular, a particularly extensive and thereby even illumination of the interior 31 of the vehicle 30 can be provided by such an ambient illumination 10. Through the use of an illumination system 1 as described, a detectability of functional elements 20 (not shown), which have in particular an element color 50, can also be ensured at all times. The comfort of a user of a vehicle 30 can thereby be improved, but in particular the safety during the use of the vehicle 30 by a user can also be increased.

REFERENCE LIST

1 Illumination system
2 Control unit
10 Ambient illumination
11 Lamp
20 Functional element
21 Functional state
22 Illumination element
23 Illumination stone
24 Frame section
30 Vehicle
31 Interior
40 Ambient color
50 Element color
60 Color space
61 Area Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method for operating an illumination system for an interior of a vehicle, the illumination system having a control unit and an ambient illumination with at least one lamp, which is designed to emit light in at least one ambient color, the method comprising:

a) determining an element color by the control unit, which element color is assumed by a functional element arranged in the interior of the vehicle for displaying the functional element;

b) providing at least one ambient color by the control unit, wherein the at least one ambient color is different from the element color determined in step a);

c) selecting an ambient color from the at least one ambient color provided in step b); and d) emitting light in the ambient color selected in step c) by the lamp of the ambient illumination.

2. The method according to claim 1, wherein the selection of an ambient color in step c) is performed manually by a user of the vehicle or by the control unit.

3. The method according to claim 2, wherein colors are saved in the control unit in a parameterized manner in a color space.

4. The method according to claim 2, wherein the functional element has one or more functional states with different element colors, wherein in step b) the at least one ambient color is provided different at least with respect to an active element color.

5. The method according to claim 1, wherein colors are saved in the control unit in a parameterized manner in a color space.

6. The method according to claim 5, wherein in the control unit, colors are saved in a parameterized manner in an additive color space.

7. The method according to claim 5, wherein in the control unit, colors are saved in a parameterized manner in an RGB color space.

8. The method according to claim 1, wherein the functional element has one or more functional states with different element colors, wherein in step b) the at least one ambient color is provided different at least with respect to an active element color.

9. An illumination system for illuminating an interior of a vehicle, having an ambient illumination with at least one lamp, which is designed to emit light in at least one ambient color, wherein at least one functional element is arranged in the interior of the vehicle, which has an element color for displaying the functional element, wherein the ambient color in a vicinity of the functional element is different from the element color of the at least one functional element.

10. The illumination system according to claim 9, wherein the illumination system has a control unit, which is designed for executing a method, the method comprising:

a) determining an element color by the control unit, which element color is assumed by a functional element arranged in the interior of the vehicle for displaying the functional element;

b) providing at least one ambient color by the control unit, wherein the at least one ambient color is different from the element color determined in step a);

c) selecting an ambient color from the at least one ambient color provided in step b); and d) emitting light in the ambient color selected in step c) by the lamp of the ambient illumination.

11. The illumination system according to claim 10, wherein the functional element has an illumination element, in particular an illumination stone, for the active emission of light in the element color.

12. The illumination system according to claim 10, wherein the functional element is formed as one or more of the group of functional elements of button, switch, slide control, and screen element.

13. The illumination system according to claim 10, wherein the functional element has a frame section, wherein the frame section is colorable in the ambient color.

14. The illumination system according to claim 9, wherein the functional element has an illumination element, in particular an illumination stone, for the active emission of light in the element color.

15. The illumination system according to claim 9, wherein the functional element is formed as one or more of the group of functional elements of button, switch, slide control, and screen element.

16. The illumination system according to claim 14, wherein the functional element is formed as one or more of the group of functional elements of button, switch, slide control, and screen element.

17. The illumination system according to claim 14, wherein the functional element has a frame section, wherein the frame section is colorable in the ambient color.

18. The illumination system according to claim 9, wherein the functional element has a frame section, wherein the frame section is colorable in the ambient color.

19. A vehicle with an illumination system for illuminating an interior of the vehicle, wherein the illumination system having an ambient illumination with at least one lamp, which is designed to emit light in at least one ambient color, wherein at least one functional element is arranged in the interior of the vehicle, which has an element color for displaying the functional element, wherein the ambient color of in a vicinity of the functional element is different from the element color of the at least one functional element.

* * * * *